United States Patent Office 3,011,465
Patented Dec. 5, 1961

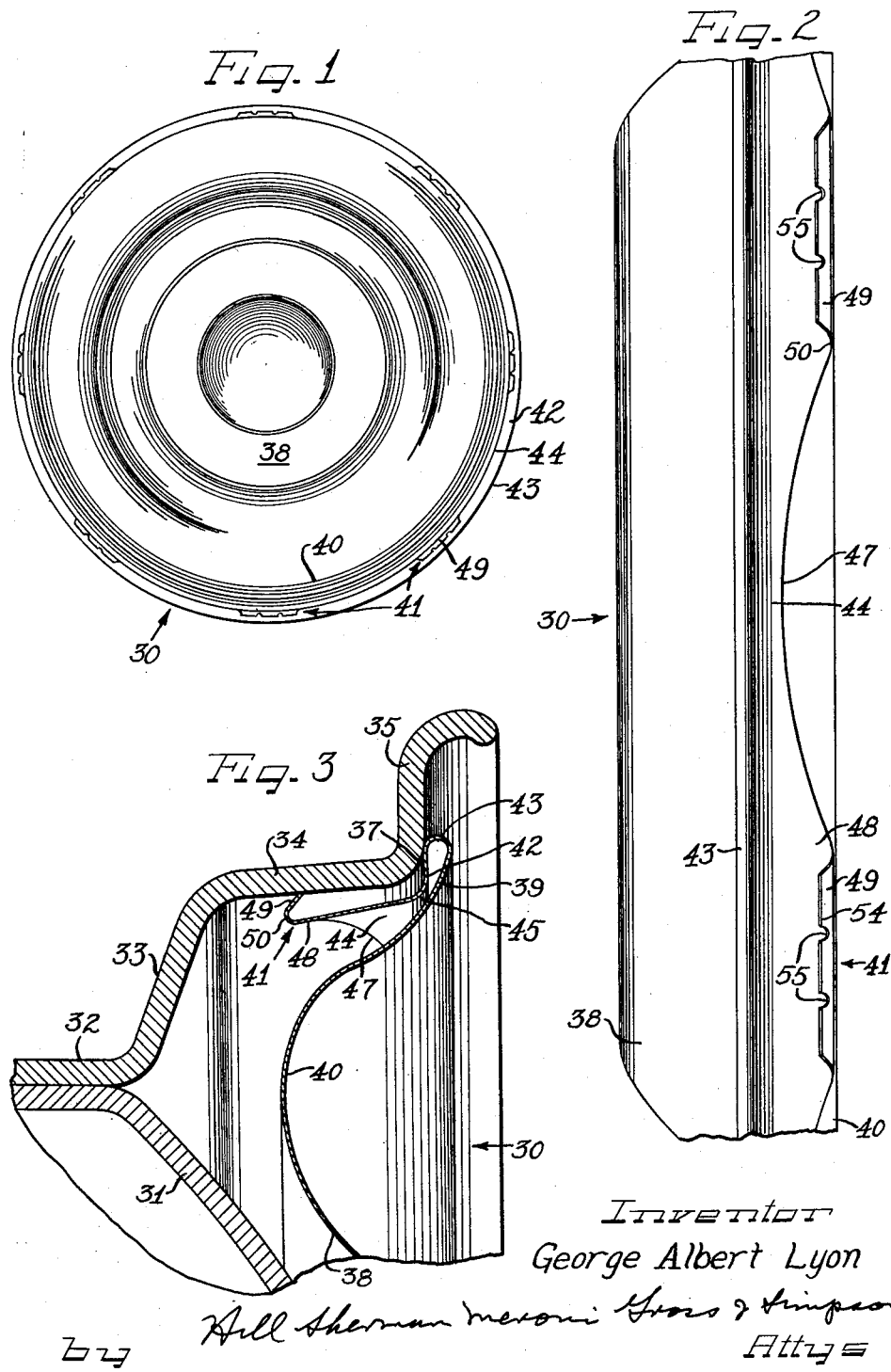

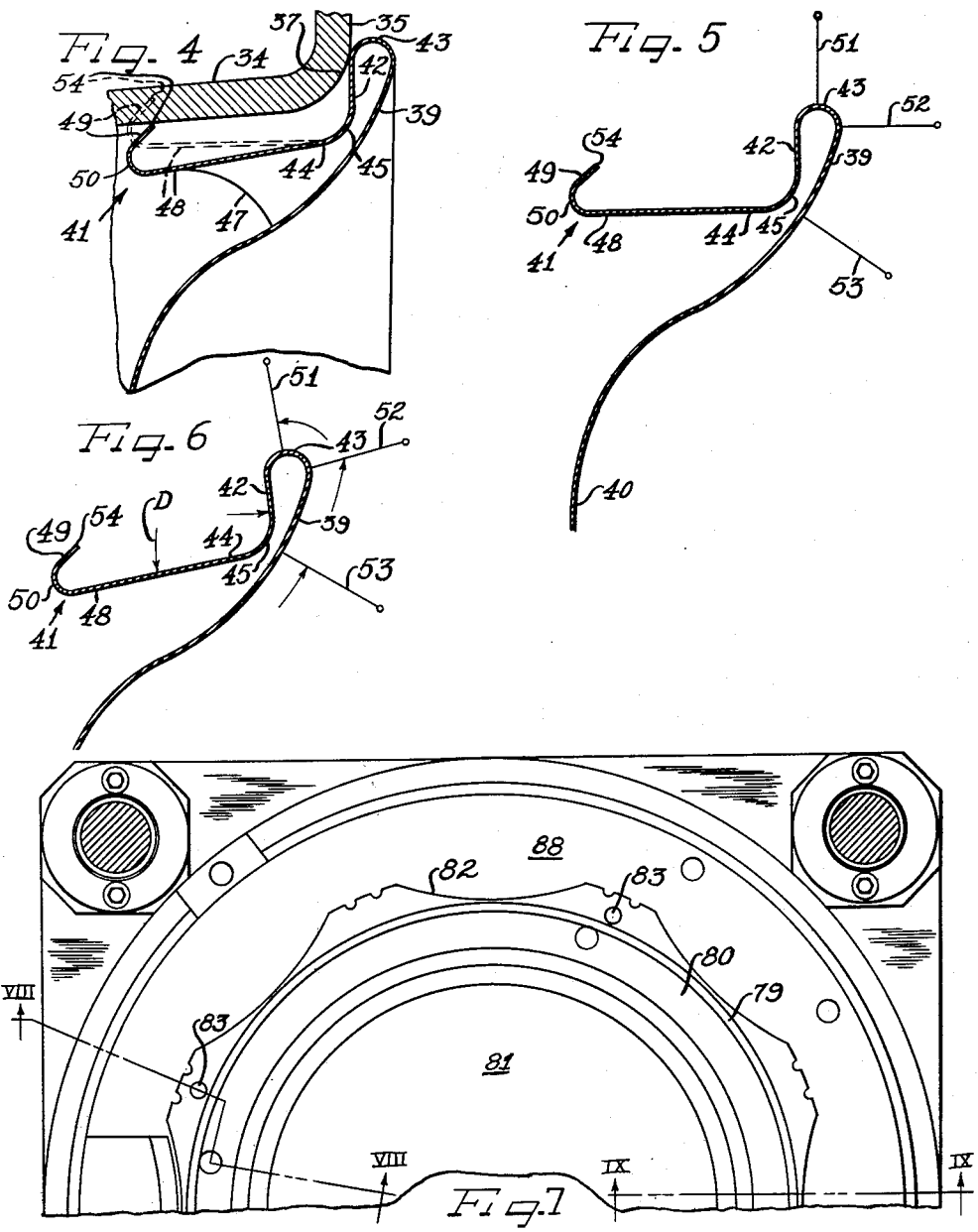

3,011,465
APPARATUS FOR MAKING WHEEL COVERS
George Albert Lyon, 13881 W. Chicago Blvd.,
Detroit, Mich.
Original application Apr. 6, 1950, Ser. No. 154,221, now Patent No. 2,807,226, dated Sept. 24, 1957. Divided and this application Mar. 12, 1957, Ser. No. 645,879
1 Claim. (Cl. 113—49)

The present invention relates to improvements in wheel covers such as are adapted to be applied to the outer sides of vehicle wheels, and more particularly concerns the provision of such covers having improved means for self-retention upon the wheels to which applied and novel means for making the covers with the self-retention means.

This application is a division of my application Serial No. 154,221, filed April 6, 1950 now Patent No. 2,807,226 dated September 24, 1957.

An important object of the present invention is to provide an improved apparatus for making ornamental and protective covers for the outer sides of wheel structures and which covers can be easily and conveniently applied by reasonable manual pressure but which can in each instance be conveniently pried free from the wheel without damage either to the wheel or to the cover so that the cover is indefinitely reusable and the wheel from which the cover may be removed will be free from damage but will remain in proper condition to receive another similar cover with full efficiency.

Another object of the invention is to provide apparatus for shaping wheel covers to afford an especially advantageous cover-retaining relationship between the tire rim of a vehicle wheel and wheel cover.

A further object of the invention is to provide an improved apparatus for shaping sheet metal blanks to provide ornamental wheel covers.

An additional object of the invention is to provide improved apparatus for making wheel cover or caps including die structure for trimming and cold working a marginal flange of a sheet metal blank to turn the same into a generally axial direction and to provide the same with cover retaining means such as retaining fingers.

Other objects, features and advantages of the present invention will be readily apparent from the following detailed description of a preferred embodiment taken in conjunction with the accompanying drawings in which:

FIGURE 1 is a rear elevational view of a wheel cover or cap embodying the features of the present invention;

FIGURE 2 is an enlarged fragmentary side elevational view of the cover of FIGURE 1;

FIGURE 3 is a fragmentary radial sectional view through a vehicle wheel showing the cover of FIGURES 1 and 2 applied to the outer side of the wheel;

FIGURES 4 and 5 are respective vertical sectional views through a marginal finger drawing die assembly in which the trimmed and partially formed cover blank is worked; and FIGURES 6 and 7 are respective enlarged more or less schematic sectional views through the forming die apparatus of FIGURES 4 and 5.

A wheel cover 30 (FIGURE 1), made with apparatus according to the present invention, is constructed and arranged to be applied to the outer side of a wheel, such as an automobile wheel, including a wheel body 31 and a tire rim 32 (FIG. 3). Both the wheel body and the tire rim may be formed from appropriate gauge sheet metal stamped or rolled to shape and the tire rim is of the multi-flange, drop center type adapted to support a pneumatic tire and tube assembly (not shown). To this end, the tir rim 32 includes a side flange 33 which extends generally radially outwardly, an intermediate generally axially outwardly and slightly radially outwardly tapered or generally frusto-conical intrmediate flange 34, and a generally radially outwardly and axially outwardly extending terminal flange 35 which merges on a rounded shoulder 37 with the intermediate flange 34.

A significant feature of the cover 30 resides in the construction whereby the cover is self-retaining upon the wheel so that the wheel need not be equipped with any special structure or expedient for retaining the cover on the wheel. Thus, the wheel need have no special cover-retaining clips, nor any holes formed therein to receive clips or parts of the cover, and no special grooves or protrusions or any other element or structure need be supplied on the wheel for retaining the cover, since the cover holds itself on the wheel. Furthermore, the cover 30 is so equipped with novel retaining means that it can be simply and easily applied to the wheel by simply pressing it into wheel covering, retained relation on the wheel. Removal of the cover from the wheel can be effected easily and expeditiously in the manner which has been customary for removal of automobile wheel hub caps, namely, by inserting a pry-off tool between the margin of the cover and the adjacent portion of the wheel and prying the cover from the wheel. In other words, means are provided for retaining the cover on the wheel in snap-on, pry-off relation.

Where desired, of course, the cover 30 could take the form of a trim which will substantially cover the outer side of the tire rim and an adjacent portion of the wheel body, while a central hub cap covers the central, bolt-on flange portion of the wheel, but in view of the modern trend toward ever smaller wheels and larger tires, a full disk cover or cap is highly desirable since a single cover member thereby suffices on each wheel rather than having two cover members. The latter desirable end is attained with unusual effectiveness and success in actual practice not only for new vehicles but also by way of replacement accessory for existing vehicles. Automobile manufacturers are adopting the cover of the present invention in ever increasing numbers because of its many inherent advantages.

From both a structural and economic viewpoint, the objectives of the present invention are attained by a fairly simple construction wherein the cover 30 is made entirely from a single piece of sheet metal, comprising a body portion 38 having a generally radially outwardly extending marginal portion 39 of a diameter to overlie the juncture shoulder 37 of the tire rim. In a preferred form the cover body radially inwardly from the marginal portion 39 is of dished, concave cross section providing a large radius generally axially inwardly extending rib 40 arranged to project into the relatively wide annular axially outwardly opening groove defined between the tire rim and the outwardly bulging wheel body 31. The central portion of the cover may be provided with any desired design configurations. The marginal portion 39 may be of convexly contoured cross sectional merging smoothly with the concave intermediate portion 40 of the cover.

Of the utmost importance are the structural features, characteristics and the functional relationships of the self-retaining means of the cover 30. To this end the outside diameter of the intermediate convex cover portion 40 is substantially less than the inside diameter of the tire rim intermediate flange 34 so as to provide a substantial radial space therebetween providing an ample clearance for novel retaining finger structure comprising an annular series of generally axially inwardly extending retaining fingers 41 formed integrally in one piece with the cover margin 39. For this purpose, the cover margin 39 comprises an underturned generally radially inwardly extending flange portion 42 having juncture with the outer exposed marginal portion 39 on a small radius bead-like radially outwardly projecting reinforcing rib juncture 43 which in assembly with the wheel lies at its axially inner side against the tire rim juncture shoulder 37 or the immediately adjacent portion of the terminal flange 35.

The underturned marginal flange 42 is provided with cover retaining finger means. In the form of FIGURE 1, the flange 42 is of a radial extent to project radially inwardly beyond and clear of the tire rim shoulder 37 and merges with an axially inwardly extending ring-like flange portion 44 from which the retaining fingers 41 extend integrally in one piece therewith. As best seen in FIGURES 3 and 4, the marginal finger-carrying flange portion 44 joins the underturned flange portion 42 on a juncture shoulder 45 which at least in the untensioned condition of the fingers is preferably spaced from the opposing inner face of the cover body. Further, the retaining finger flange 44 is accommodated in the space or clearance between the tire rim intermediate flange 34 and the adjacent inwardly projecting intermediate cover portion 40.

It will be observed (FIGS. 1, 2 and 3) that the inwardly extending flange portion 44 of the retaining flange structure is formed on a circle concentric with the cover and with the tire rim intermediate flange 34 but is of substantially smaller diameter than the inner face of the tire rim intermediate flange to remain in spaced relation thereto. The flange 44 is, however, of greater diameter than the contiguous cover portion 40.

Each of the retaining fingers 41 extends axially inwardly in the plane of the flange 44 and comprises an integral extension in one piece with the flange, actually comprising annularly spaced portions of the flange. For this purpose, the flange portion 44 is recessed at uniformly spaced intervals as indicated at 47 to define the individual retaining finger extensions 41 which are thus provided with finger back or body portions or legs 48. By having the cutouts or recesses 47 of generally arch shape the finger extension bodies or backs 48 are of flaring outline from their tips to the flange 44. That is, the finger backs are of substantially greater width at juncture with the flange 44 than the width of the fingers at their terminal portions. Furthermore, by having the recesses 47 of arcuate outline, the edges defining the cutouts are without any angular notches or other angular juncture with the body of the flange 44, but the sides of adjacent finger backs 48 merge on a continuous arc. Since the flange 44 is circular, and the finger backs 48 are also arcuately curved transversely on the curvature of the flange 44 and are thereby substantially stiffened so that they resist bending when radial pressure is applied thereto.

Each of the distal edge or terminal portions of the retaining fingers 41 is formed with an angular generally radially outwardly divergently and somewhat axially outwardly projecting gripping extremity leg or flange portion 49. These gripping portions are joined integrally in one piece with their extension back body portions 48 by means of respective rib-like junctures 50 which are arcuate both in length and in cross section and afford a substantial stiffening reinforcement between the finger back and terminal flange portions.

To assure stiffness in the finger terminal flange portions 49, they are formed quite short relative to the finger backing backing body portions 48. Thus, it will be observed that each of the terminal gripping flange portions 49 is only a small fraction as long as its finger backing body portion 48. In a practical form, the terminal flange portions 49 may be only about one-fourth as long as the length of the finger backing portions from the juncture 50 to the juncture shoulder 45 of the retaining flange structure. The finger back portions 48, on the other hand, are strongly resiliently flexible in radial direction relative to the cover margin 39, although by reason of the bowed transverse cross section the portions 48 themselves are very resistant to bending on lines transverse to their length, and because of the connection afforded between adjacent retaining fingers 41 by the continuous flange 44 substantial additional resilience will be inherent in the finger portions 48.

Prior to application of the cover 30 to the wheel, the flange 44 and the finger body backs 48 are generally cylindrical. In this condition, the tips of the retaining terminal flanges 49 of the retaining fingers extend to a diameter substantially greater than the inside diameter of the terminal flange 34.

In applying the cover 30 to the wheel, the cover is generally centered with respect to the wheel and with the axially inner sides of the gripping terminal portions 49 of the fingers cammingly engaging at the axially outer margin of the tire rim intermediate flange 34 at or adjacent to the shoulder 37. Axially inward pressure is then applied to the cover, which causes the retaining finger terminal portions 49 to cam inwardly along the inner, frusto-conical face of the intermediate flange 34. Thereby the finger terminal portions 49 are forced progressively radially inwardly and since the terminal portions 49 are relatively short and stiff and are rigidly reinforced by the respective juncture ribs 50, which have not only a transverse but also cross sectional, compound reinforcing radii, the radial inward pressure does not substantially deflect or bend the retaining terminal portions 49 but is reflected in resilient inward deflection of the finger extension body portions 48.

Such resilient deflection is a desirable tensioning feature for effective cover retaining gripping engagement of the retaining finger terminals 49 at their edges 54 with the tire rim flange. Such tensioning also assures that the corners of the retaining terminals 49 increased by notches 55 will effectively bite into the rim surface to hold the cover against turning on the wheel. Further details as to the function and advantages of this cover retaining structure will be found in my Patent 2,624,634 issued January 6, 1953.

In the manufacture of the cover 30, it is desirable that from an economy standpoint the cover be made from as inexpensive material as practicable. It is also desirable that the material lend itself easily to a commercially acceptable finish. Sheet steel is a desirable material for this purpose, and more especially stainless steel, preferably chrome-nickel steel. Among the valuable characteristics of such material is its ready workability in thin gauge stock and its ready adaptability to high lustrous polish and plating. Another and very important attribute of chrome-nickel steel sheet has been found to reside in the fact that although in the sheet before working it has primarily austenitic characteristics, it is capable of developing martensitic character on cold working. The material from which the cover 30 is made should have these characteristics because it is desirable to form the cover by drawing the metal sheet to form. An austenitic steel lends itself well to die forming but does not possess sufficient hardness and resilience to afford adequate tensioning of the retaining fingers for the cover. However, where the material is capable of developing martensitic character, that is hardness which is an attribute of a tempered, resilient steel it is possible to make the entire cover from a single piece of material, including not only the drawn body portion of the cover but also the resilient spring retaining flange and finger structure.

Highly desirable results have been obtained by using sheet steel such as 16 to 18—6 to 8 chrome-nickel or stainless steel of from .019 to .021 inch thickness or gauge. Such material will have a tensile strength of from approximately 100,000 to 125,000 pounds per square inch and a yield strength of from approximately 47,000 to approximately 49,000 pounds per square inch, while the elongation of a blank specimen subjected to tests will be from approximately 53% to 58%.

A preferred method of making the cover to attain the desired form and functional characteristics on an efficient economical mass production basis comprises drawing the body portion of the cover and then drawing and cold working the marginal flange and retaining finger portion of the cover to change the austenitic material into martensitic character in the marginal portions of the cover, having the hardness and resilience requisite for the self-retaining functions of the retaining fingers.

In my Patent 2,707,449 issued May 3, 1955, is described a method of making wheel trim or covers for which improved apparatus as illustrated in FIGURES 4 through 7 of the present application is adapted to be used in shaping the material of the cover in certain steps of the method, and more particularly in certain steps of the method following those for which the apparatus in my Patent No. 2,807,226 is adapted to be used.

After the sheet metal blank from which the cover is to be made has been formed initially to the shape best seen in FIGURES 4 and 6, and including an axially outwardly projecting annular marginal rib R radially inwardly from a radially extending flat marginal finger portion, and with the depressed intermediate annular portion 40 radially inwardly from the rib R, the blank is placed in a drawing press die assembly 89 (FIGS. 4, 5, 6 and 7) wherein the retaining finger flange portion of the blank is drawn and cold worked from the horizontal or radial position to the axially extending position of the finished cover. To this end, the die assembly 89 comprises a yieldable normally upwardly biased supporting and gripping ring 90 guided by an encircling marginal working and forming ring 91, both of which rings are carried by a die base member 92. The supporting and clamping ring 90 is normally biased into a position with the upper portion thereof above the encircling forming ring 91 and has the upper surface thereof contoured complementary to the annular intermediate rib portion 40 and has in the radially outer side thereof and circumscribing said upper surface an annular recess conformed to receive the marginal rib R of the cover blank so that the cover blank can be nested thereon in centered relation in the die assembly as shown in FIG. 4. Thereupon, a die head 93 is lowered toward the lower portion of the die assembly until a spring biased downwardly projecting hold-down ring 94 is brought to bear against the intermediate cover rib portion 40 on the supporting ring 90 (FIG. 6) and by the compression of the springs acting on the yieldable clamping and hold-down rings 90 and 94 in the progressive lowering of the die head 93 the cover blank radially inwardly from the marginal rib R therein is effectively and uniformly held to shape and against outward drawing of the material thereof in the further processing of the blank. Continued downward movement of the die head 93 brings a shaping ring 95 complementary to the inner contours of the rib R in the blank down into the channel defined by the rib R to clamp the portion of the cover blank engaged thereby and also by the supporting and gripping ring 90 quite effectively against the ring 90.

Forming of the radially extending trimmed margin of the blank to cylindrical form and cold working of the margin to impart martensitic characteristics thereto so as to attain substantially spring steel qualities in the marginal flange structure of the cover is accomplished by driving the forming ring 95 down beyond the point at which it clamps the cover margin rib R against the ring 90, by effecting downward yielding of the ring 90 and bending working of the radially extending margin of the blank over a relatively sharp substantially V-shaped working and forming rib 97 upstanding from the inner margin of the die ring member 91. For this purpose, the forming rib 97 is in a plane at its inner side with a cylindrical inner surface 98 on the ring 91 and of a diameter substantially equal to the outside diameter of the marginal rib R of the cover blank. Thus, as the forming ring 95 presses down within the rib R the radially extending margin of the blank is drawn radially inwardly and downwardly over the cold working ridge 97 and is formed cylindrical between the cylindrical surface 98 and the opposing cylindrical surface of the forming ring 95.

In the final increment of working and shaping of the cover blank margin, an outer shaping ring 99 having a groove 100 in its radially inner lower face margin and complementary to the radially outer side of the cold working ridge 97 engages the tip or extremity portions of the finger extensions of the cover margin and imparts thereto the gripping finger flange angularity to the body portions of the finger extensions. FIGURE 6 shows the die assembly 89 just after the hold-down ring 94 and the shaping ring 95 have made operative contact with the blank and just before cold working of the radially extending margin of the blank has occurred. FIGS. 5 and 7 show the die assembly and the cover blank at the completion of the marginal cold working and final formation of the angular finger terminal flanges 49 of the cover.

The cover is now complete except for the final forming step wherein the hollow rib R at the margin of the cover is turned radially outwardly. This may be effected according to the method in my aforesaid Patent 2,707,449 utilizing apparatus as covered in my Patent No. 2,878,769 dated March 24, 1959.

The present application is a continuation-in-part of my application Serial No. 45,323 filed August 20, 1948, now abandoned, but which was copending with my said application 154,221 (Patent No. 2,807,226) of which the present application is a division.

It will be understood that modifications and variations may be effected without departing from the scope of the novel concepts of the present invention.

I claim as my invention:

In apparatus for forming sheet metal wheel covers, opposed coactive separable relatively reciprocable concentric die assemblies, one of said assemblies including a circular member having an annular surface projecting toward the other and opposing die assembly and transversely contoured to interfit nestably with an annular intermediate portion of a partially formed cover blank, said circular member including an annular recess in the radially outer side thereof and circumscribing said surface, said annular recess being conformed to receive a marginal annular generally axially extending rib about said intermediate annular portion of the blank, said circular member having a radially outer periphery substantially aligned with the radially outer side of said rib-receiving recess, a second circular member comprising part of said one assembly and having a radially inner periphery about said first mentioned member and providing an axial forming surface aligned with the radially outer side of said rib receiving recess, means forming part of said one assembly normally yieldably biasing said first mentioned member to project said surface thereof a predetermined distance beyond the face of said second member which opposes said other assembly so that a cover blank can be readily fitted in forming position relative to said first mentioned member and with a radially extending flange portion projecting radially outwardly from the cover blank marginal rib into opposing relation to said face of said second member, a circular shaping ring portion carried by said other die assembly and transversely conformed to fit into the hollow interior of the cover marginal rib upon closing of the die assemblies into coactive relation, said shaping ring portion having a generally axially extending radially outer peripheral surface complementary to said inner peripheral surface of said second circular member but of a smaller diameter equivalent to the thickness of the material of the cover blank, said other die assembly including means engageable against the intermediate portion of the cover blank engaged by said first mentioned circular member and operable to thrust said first mentioned member reciprocably against said biasing means to move the first mentioned member into position relative to the second circular member for straightening the radial marginal flange of the cover blank between said axially extending surfaces at the inner periphery of said second circular member and the outer periphery of said shaping ring portion, and means for effecting relative axial reciprocal movements of said die assemblies into closing cover forming and separated positions, said second circular member having aligned with said inner peripheral axially extending surface thereof a forming rib of substantially V-shape cross-section projecting toward said shaping ring portion and said shaping ring portion having a recess complementary to said forming rib and cooperable therewith in the final increment of closing, forming coaction of the die assemblies to shape divergent cover-retaining terminal flange structure on the terminus of the straightened marginal flange of the cover blank.

References Cited in the file of this patent
UNITED STATES PATENTS

| | | |
|---|---|---|
| 1,672,694 | Shrum | June 3, 1928 |
| 1,954,816 | Hothersall | Apr. 17, 1934 |
| 2,223,321 | Kempe | Nov. 26, 1940 |
| 2,282,588 | Lyon | May 12, 1942 |
| 2,304,582 | Lyon | Dec. 8, 1942 |
| 2,316,346 | Lyon | Apr. 13, 1943 |
| 2,433,058 | Mesaros | Dec. 23, 1947 |
| 2,434,375 | Van Saun | Jan. 13, 1948 |
| 2,492,886 | Punte | Dec. 27, 1949 |
| 2,656,887 | Judd | Oct. 27, 1953 |
| 2,807,226 | Lyon | Sept. 24, 1957 |